April 20, 1943.    B. N. BLETSO ET AL    2,317,247
CUT NAIL MACHINE
Filed July 23, 1942    12 Sheets-Sheet 1

Inventors:
BRUCE N. BLETSO and
GEORGE H. PERKINS,
by: John E. Jackson
their Attorney.

Inventors:
BRUCE N. BLETSO and
GEORGE H. PERKINS,
by: John E. Jackson
their Attorney.

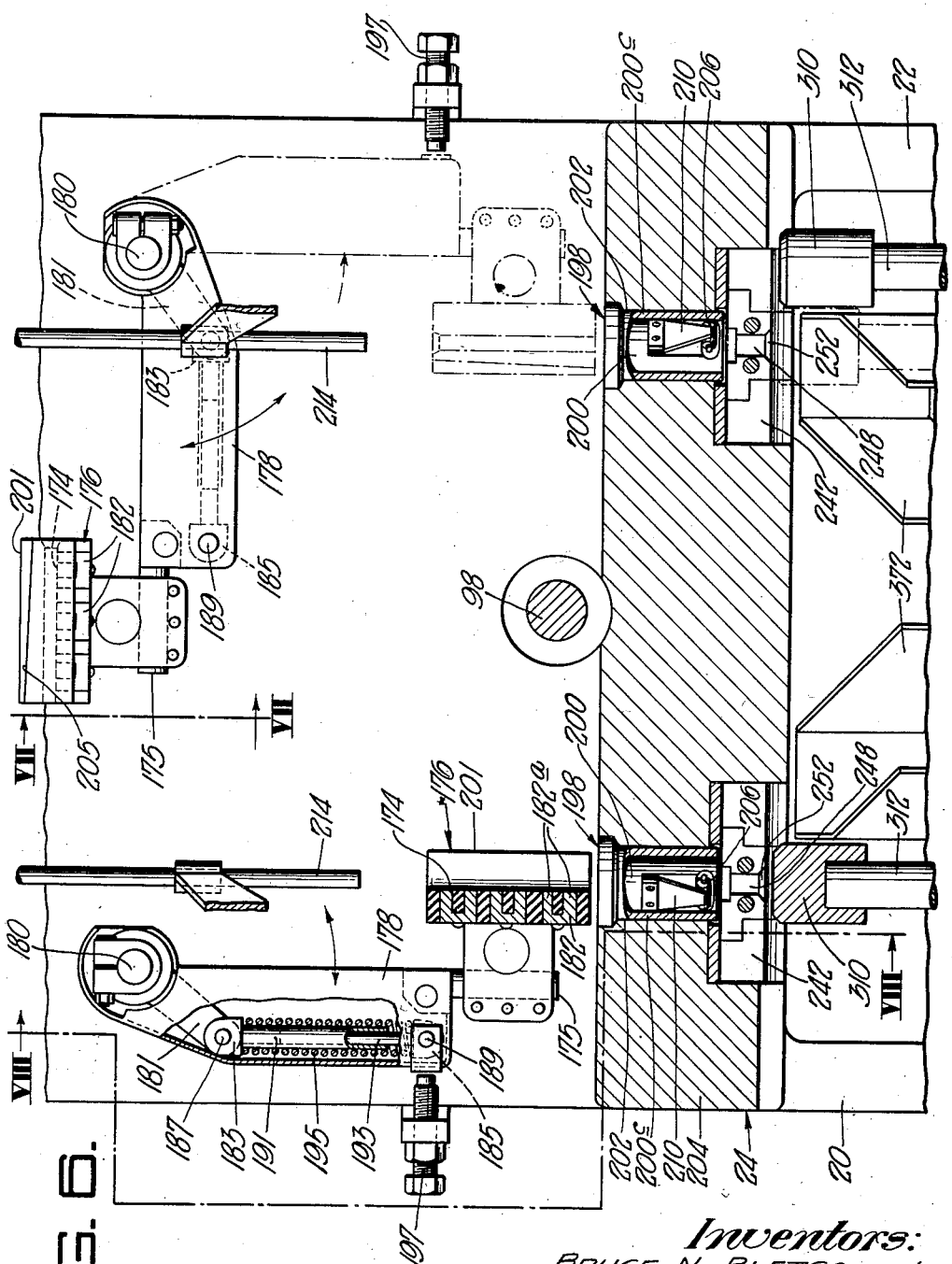

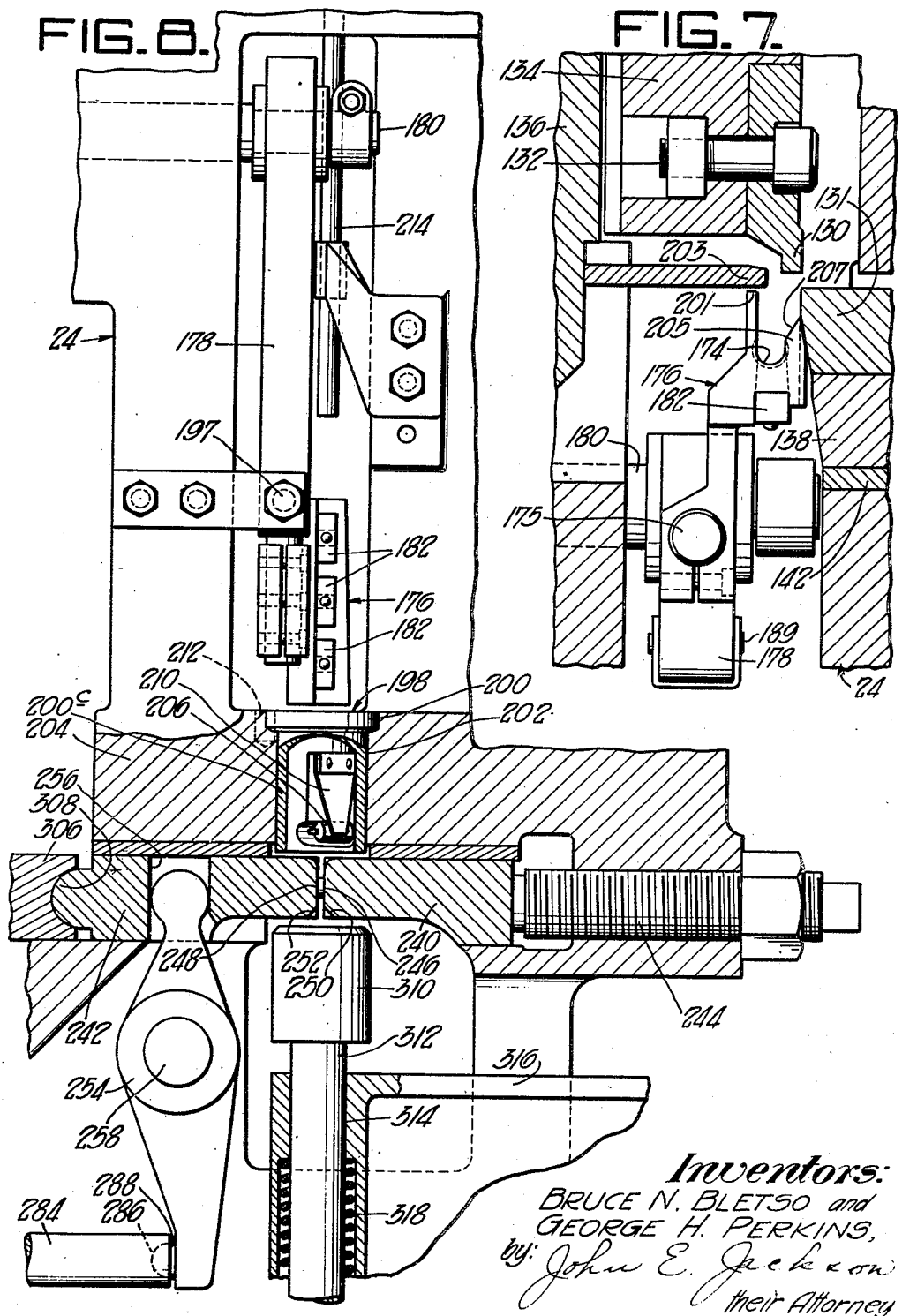
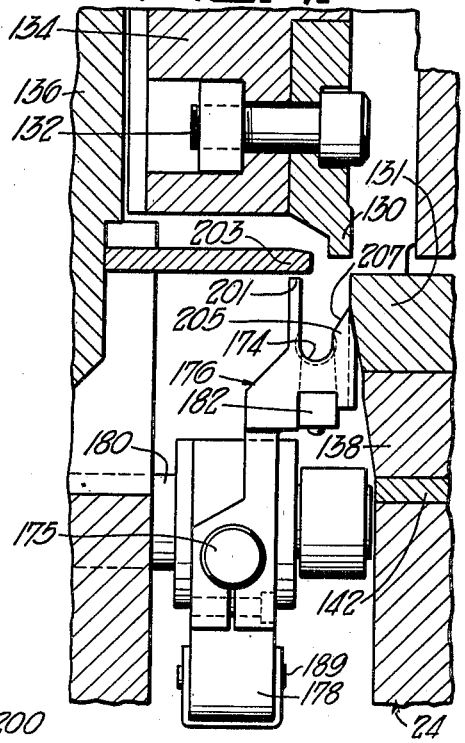

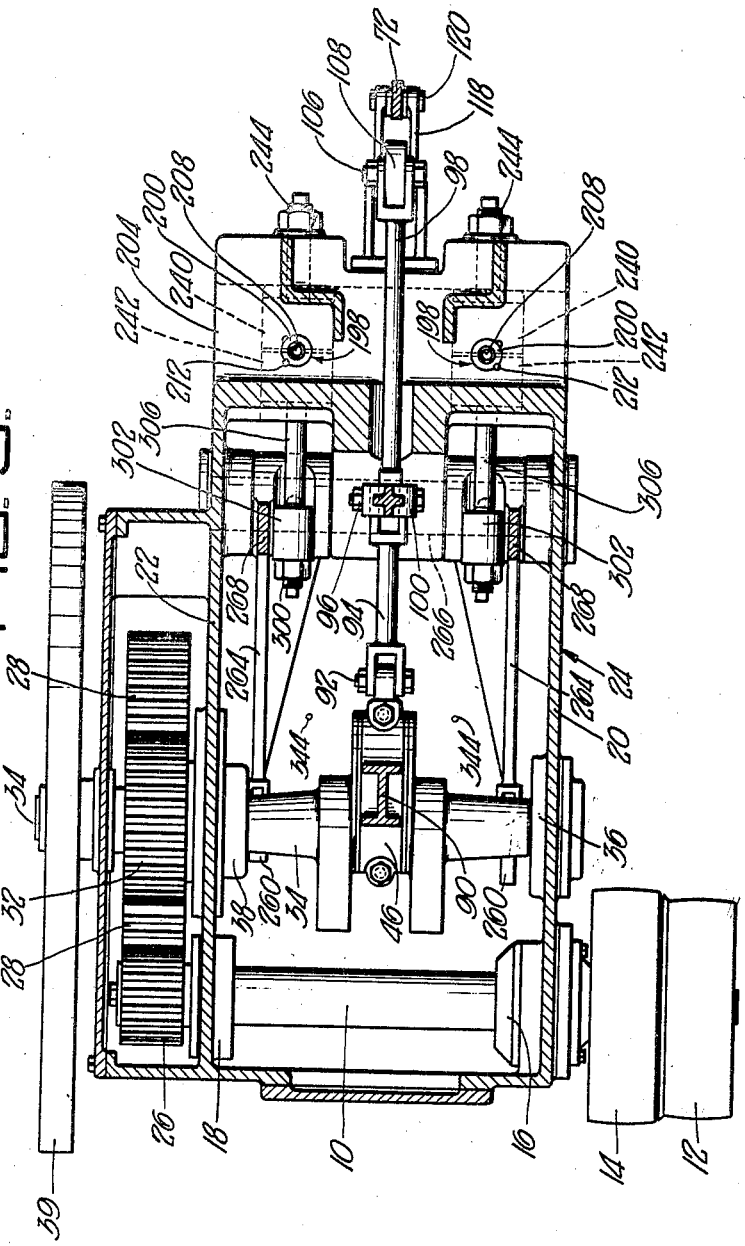

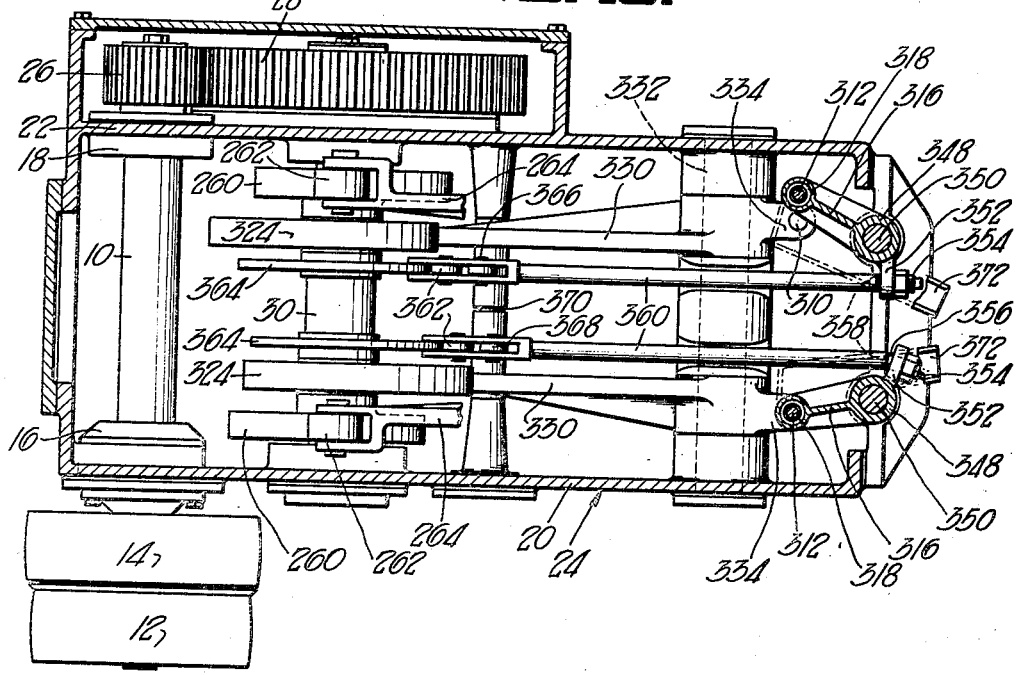

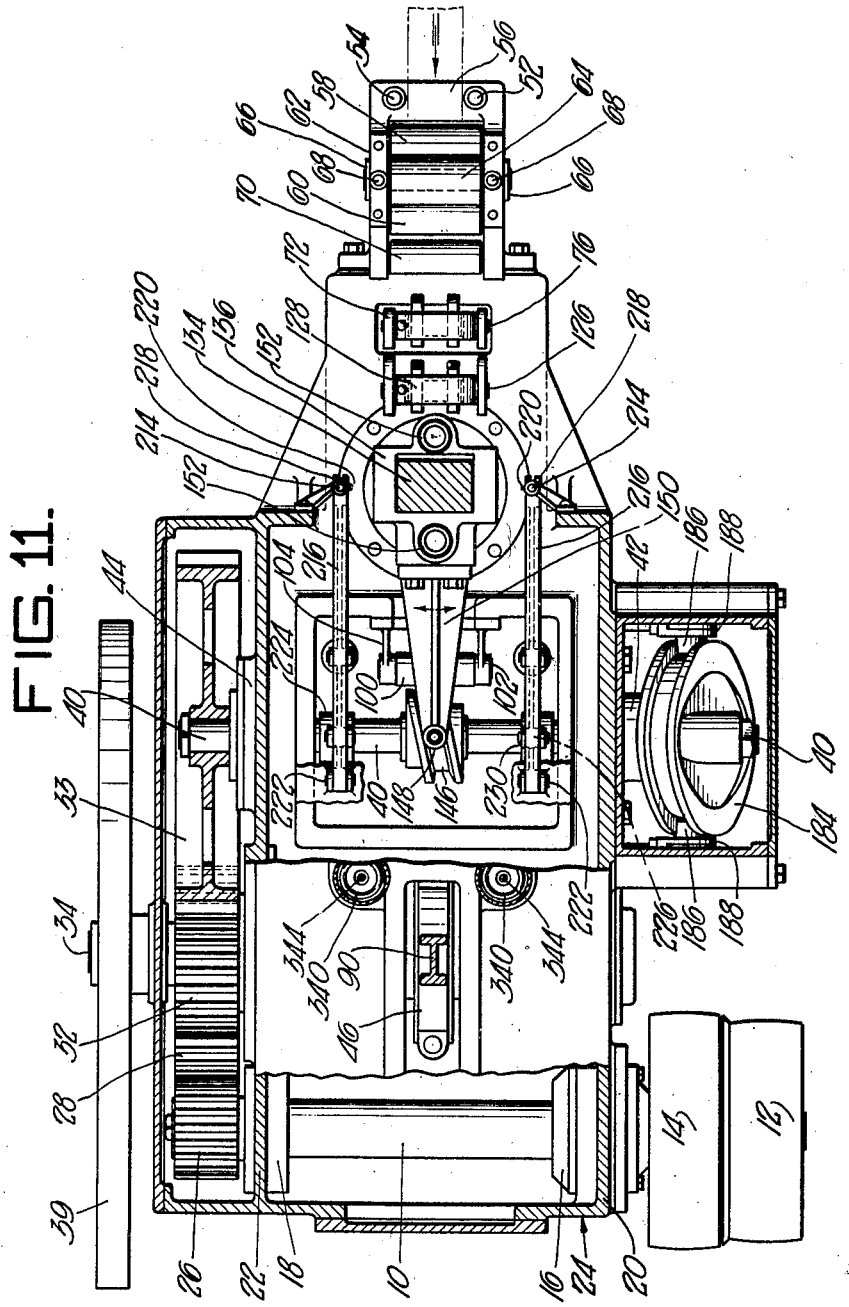

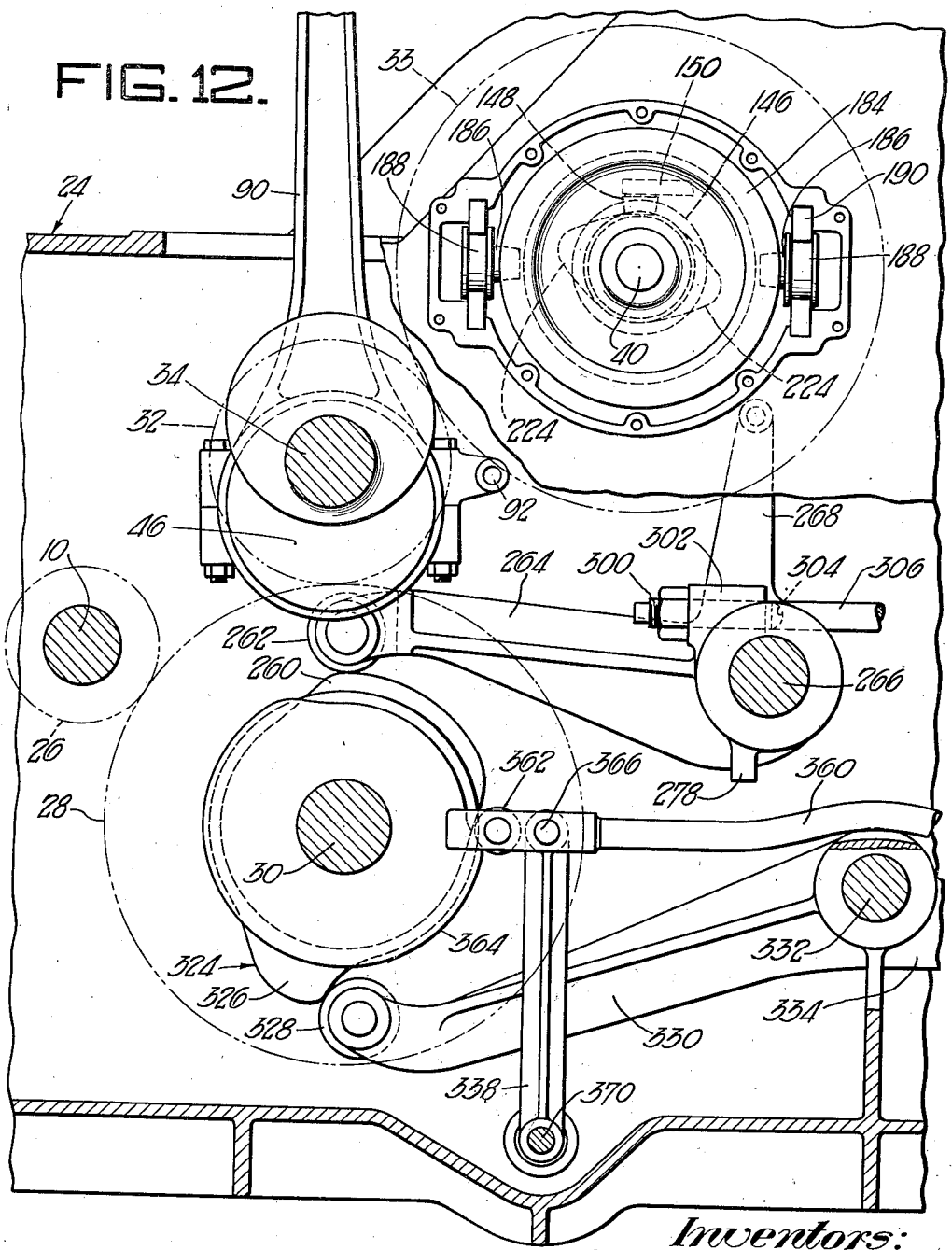

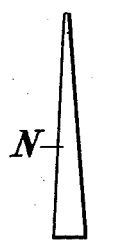
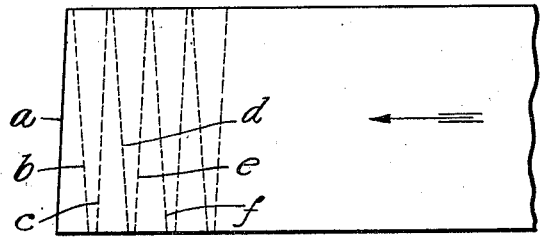
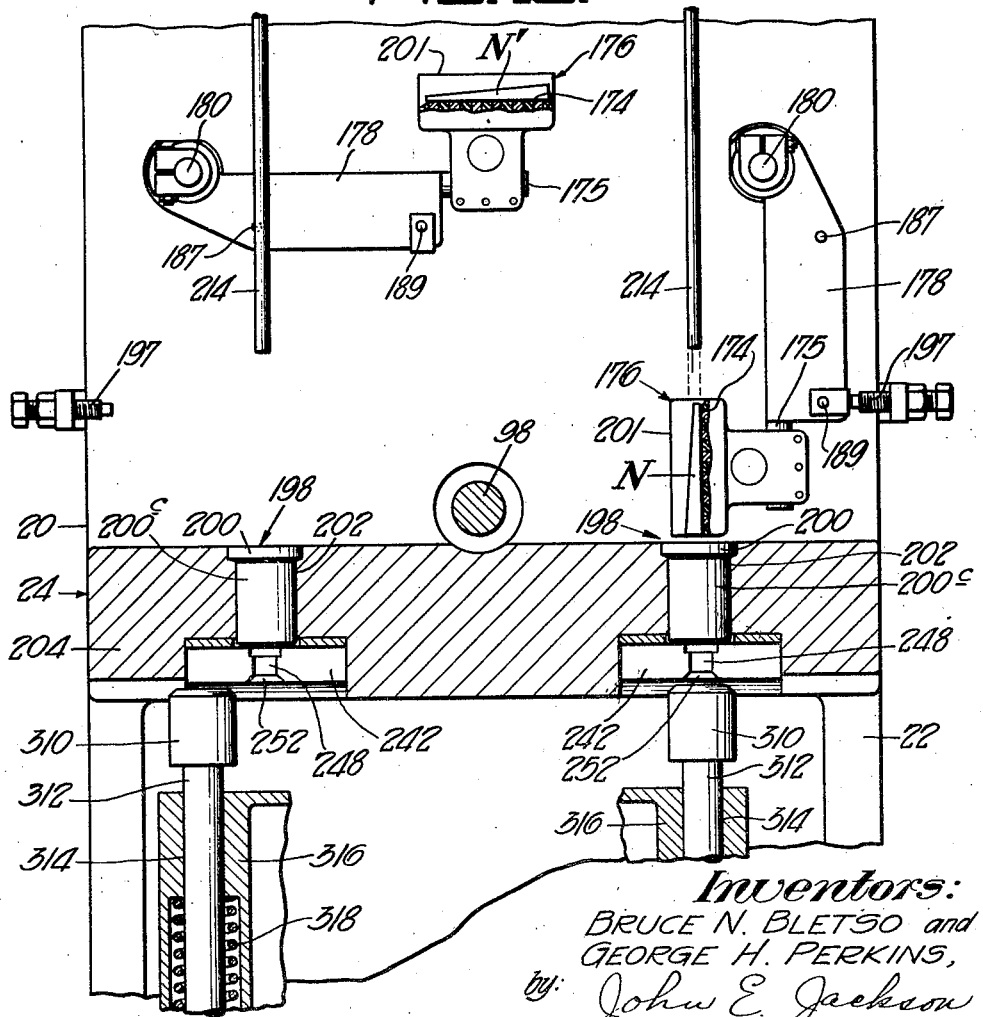

April 20, 1943.  B. N. BLETSO ET AL  2,317,247
CUT NAIL MACHINE
Filed July 23, 1942  12 Sheets-Sheet 12

Inventors:
BRUCE N. BLETSO and
GEORGE H. PERKINS,
by: John E. Jackson
their Attorney.

Patented Apr. 20, 1943

2,317,247

UNITED STATES PATENT OFFICE 2,317,247

CUT NAIL MACHINE

Bruce N. Bletso, East Cleveland, and George H. Perkins, Cleveland, Ohio, assignors to The American Steel and Wire Company of New Jersey, a corporation of New Jersey Application July 23, 1942, Serial No. 452,098

24 Claims. (Cl. 10—30)

The present invention relates to machines used to rapidly produce cut nails.

One object of the invention is to provide improved mechanism which will produce better cut nails at a higher rate of speed than possible with prior art mechanisms and with a minimum waste of material. Another object is to provide mechanism for operating an oscillating slidably mounted shear whereby nail blanks are so sheared at an angle to the center line of the blank, thus causing the nail blank to taper in width from the butt end toward the pointed end.

A further object of the invention is to provide a machine which will make cut nail blanks adapted to be held between pinch dies which engage either the flat parallel sides of the blank or the tapered edges thereof. It is a further object of the invention to provide positive means effective to transfer nail blanks from a shearing station to a heading station.

Another object of the invention is to provide means for positively orienting each nail blank while it is en route from the shearing station to the heading station in order that the blank may be properly positioned for effective engagement with pinch dies and a heading die.

A further object of the invention is to provide improved feed mechanism which can be adjusted to feed varying increments of nail stock into position to be sheared so that nail blanks of varying predetermined sizes can be produced accurately at a high rate of speed and with no waste of material.

A further object of the invention is to provide an improved transfer mechanism which will move each nail blank from the horizontal position in which it is sheared to a vertical position to a station where a head is to be formed thereon.

Another object of the invention is to provide means for advancing nail stock in uniform increments combined with means for shearing such stock by means of an oscillatable shear so as to successively form oppositely pointed nail blanks at a high rate of speed, in combination with means for transferring the blanks pointed in one direction to a vertical position at one side of a vertical center line of the machine and with similar transfer means for transferring the oppositely pointed blanks to the opposite side of said vertical center line whereby the blanks, after being transferred, occupy vertical positions in which they both point upwardly and thus in the same direction.

A further object is to provide mechanism for shearing oppositely pointed blanks by utilization of a single oscillatable shear blade whose position is periodically shifted, in combination with symmetrically arranged transfer devices effective to move said blanks from the horizontal sheared position to respective symmetrically arranged head forming stations with respective means at the head forming stations for gripping the butt end portions of the blanks and forming heads thereon.

A further object is to provide means for transferring sheared blanks from a horizontal position to a vertical position, in combination with means for gripping the blanks while vertically disposed and forming heads thereon and shifting the head forming dies to a non-operative position to facilitate the downward ejection of the headed nail.

A still further object is to provide, in combination with nail blank and gripping means, an ejector mechanism and guiding means swingable into and out of endwise alignment with the nail blank gripping means, said guiding means being effective to direct the ejected headed nails to a suitable storage receptacle such as a nail keg or the like.

Still a further object of the invention is to so combine and coordinate the various instrumentalities herein shown and described that they effectively perform the individual and conjoint functions hereinafter set forth.

All phases of the invention will be fully apparent from consideration of the following detailed disclosure, the accompanying drawings and the appended claims.

Figure 1:
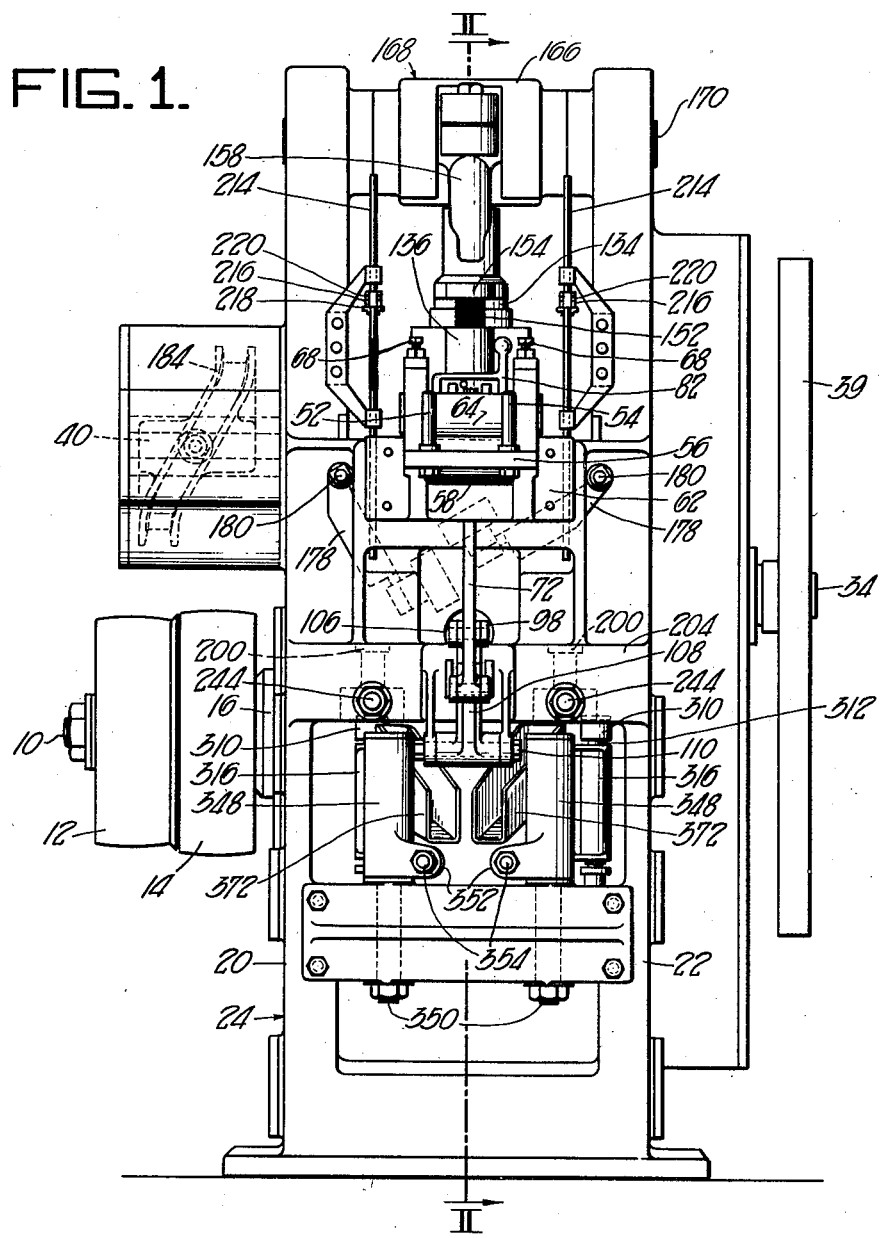
Figure 1 is a front elevation of a cut nail forming machine embodying the invention.
Figure 2:
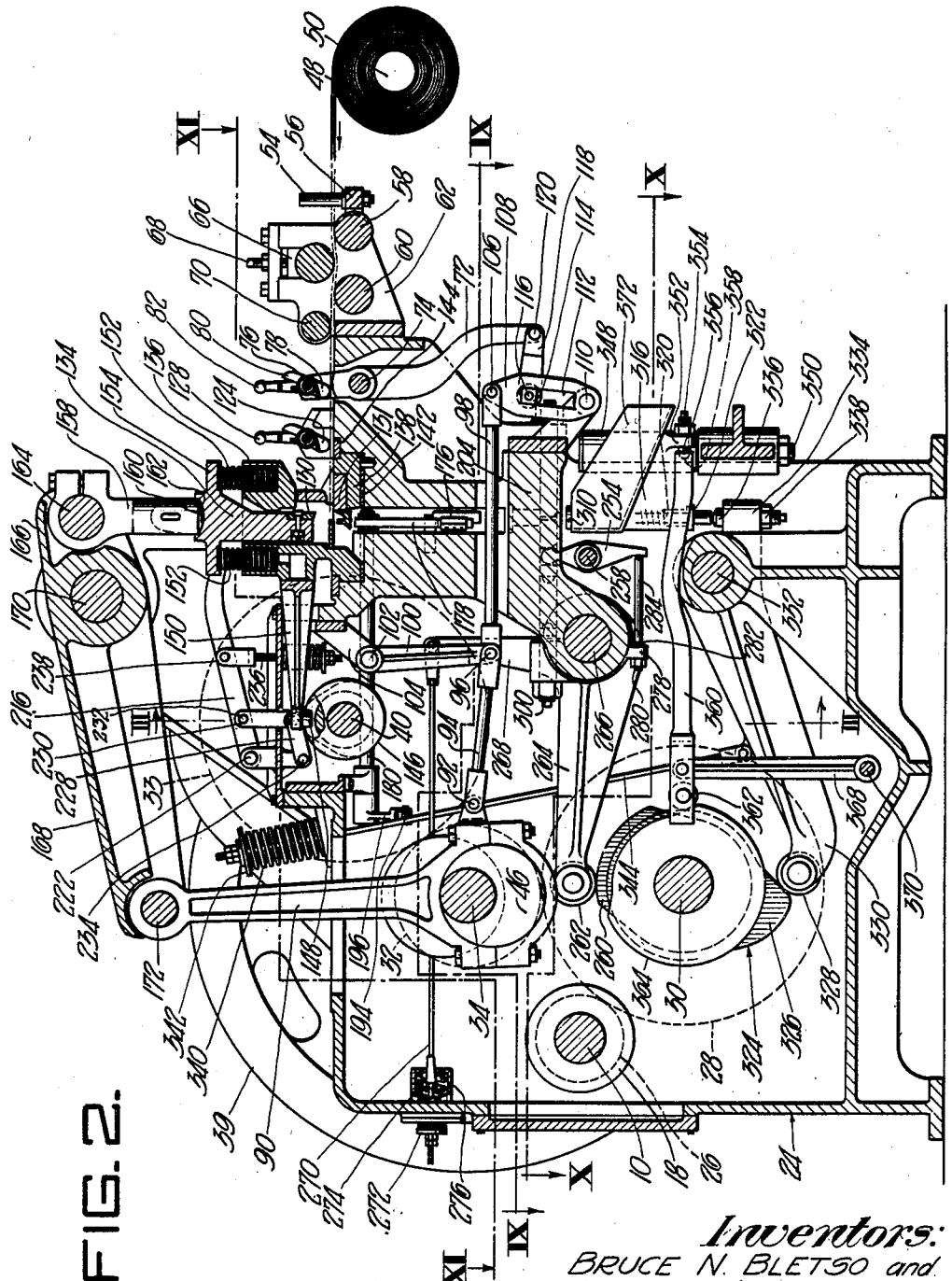
Figure 2 is a vertical longitudinal section taken approximately on line II—II of Figure 1.
Figure 3:
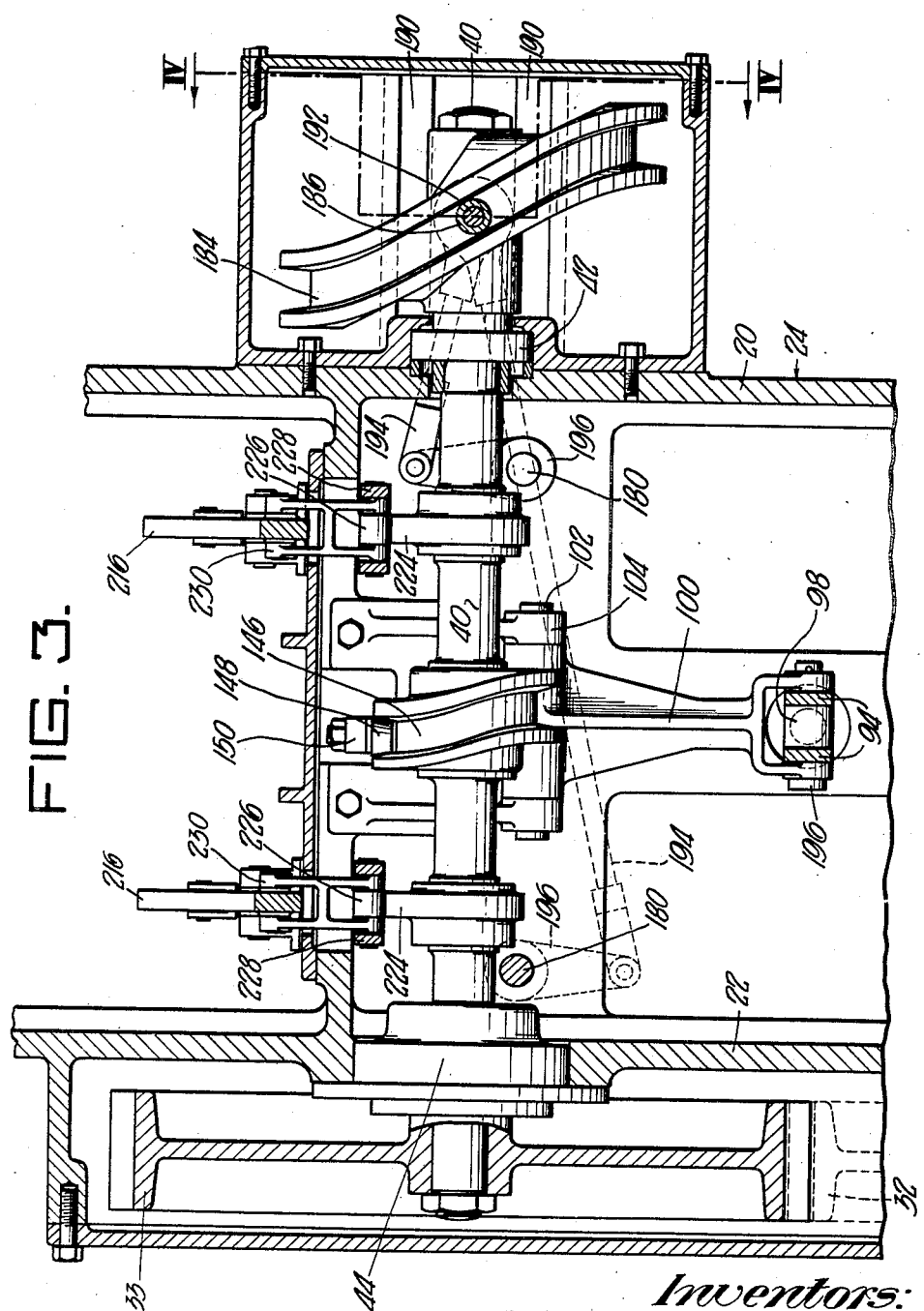
Figure 3 is a vertical section on line III—III of Figure 2.
Figure 17:
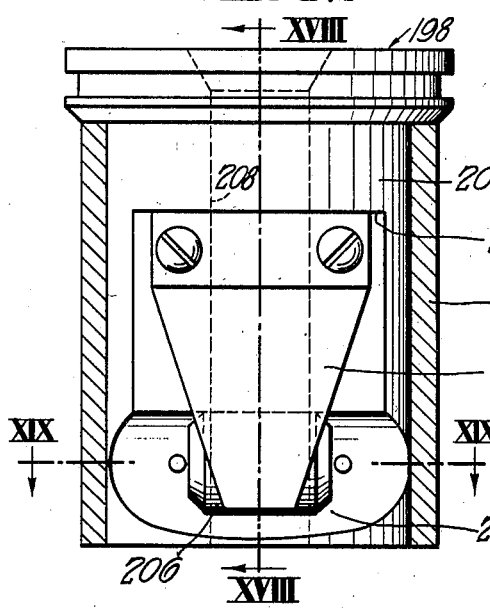
Figure 18:
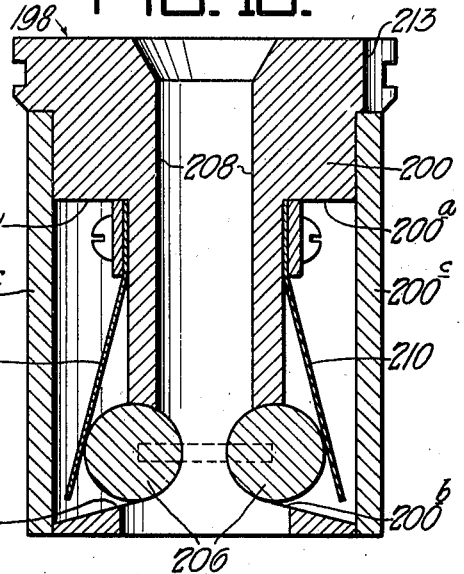
Figure 19:
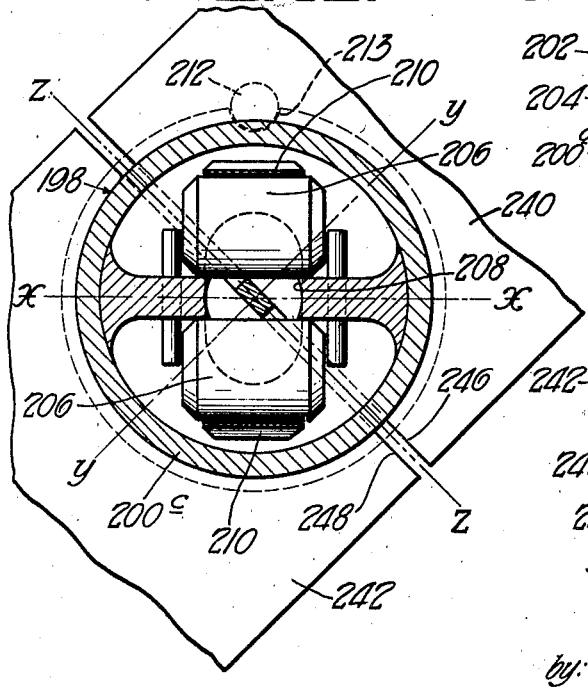
Figure 20:
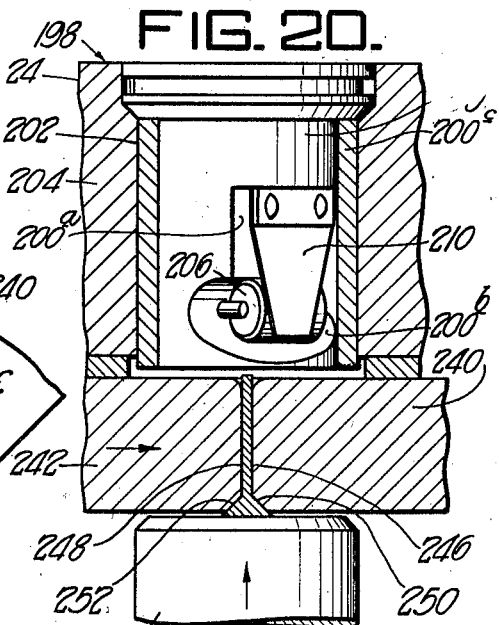

Figure 6 is a skeleton view illustrating duplicate nail blank transfer mechanisms symmetrically located on opposite sides of a vertical center line of the machine as viewed from the front, each mechanism being effective to transfer the blanks from a horizontal position to a substantially vertical position, the view also illustrating respective pinch dies and heading dies symmetrically arranged on opposite sides of said center line;

Figure 7 is a detail section on line VII—VII of Figure 6 illustrating magnetic means for impositively holding a nail blank in a recessed portion of a transfer member;

Figure 8 is a detail view of one of the transfer arms, the view being approximately taken on line VIII—VIII of Figure 6;

Figures 9, 10 and 11 are horizontal sections on the correspondingly numbered section lines of Figure 2;

Figure 12 is a fragmentary detail of the main operating shaft of the machine, certain of the gearing, associated cams and related mechanism;

Figure 13 is a plan view of a short length of flat nail stock, the broken lines illustrating the manner in which the same is sheared by the machine of the present invention so as to successively produce oppositely pointed nail blanks;

Figure 14 is a view of a nail blank sheared from the stock shown in Figure 3 in one shearing operation;

Figure 15 is a view of a similar nail blank produced in a succeeding operation;

Figure 16 is a diagrammatic view illustrating the manner in which the nail blanks of Figures 14 and 15 are both transferred from the horizontal position in which they are sheared to the vertical position in which they are to be headed, in which vertical position both nail blanks are pointed upwardly;

Figure 17 is a detail view of an orienting element adapted to properly juxtapose each nail blank in variable predetermined position with respect to the pinch dies;

Figure 18 is a section on line XVIII—XVIII of Figure 17;

Figure 19 is a detail sectional plan view taken on line XIX—XIX of Figure 17, showing a nail blank which has been properly oriented by the mechanism of Figures 17 and 18 engaged with pinch dies which hold the nail blank during the formation of a head thereon;

Figure 20 is a section on line y—y of Figure 19 showing the manner in which the pinch dies and the heading die cooperate to upset a head on the nail; and Figure 21 is a detail view of the strip feeding mechanism.

General

As will be hereinafter pointed out in greater detail, the machine of the present invention is so designed, constructed and arranged that it is effective to receive nail stock from a ribbon-like coiled supply and to straighten said stock and dispose it in a horizontal position and advance predetermined increments thereof intermittently in rapid succession. After the advance of each increment of horizontally disposed nail stock, a vertically reciprocating shear severs a nail blank therefrom. The vertically reciprocating shear blade is mounted in such a way that it can be oscillated as well as reciprocated and the operating mechanism for performing the shearing and oscillating functions are so coordinated that oppositely tapering nail blanks are produced successively as each increment of stock is advanced.

Immediately after each blank is sheared it falls by gravity into a respective one of two like transfer devices located symmetrically on opposite sides of a vertical center line of the machine as viewed endwise. Thus the transfer arm on one side of the vertical center line of the machine shifts the horizontal blank pointing in one direction from the horizontal plane into a vertical plane with a tapering end directed upwardly. Similarly, the transfer arm on the other side of the machine shifts the oppositely pointed nail blank from the horizontal to the vertical. Thus, although the successively sheared nail blanks are tapered in opposite directions while in the horizontal position, they both taper upwardly when transferred to the vertical position since they are transferred from opposite sides of the same center line.

After each upwardly tapering blank has been transferred to the vertical position it is moved downwardly through an orienting device effective to properly position the same to be gripped by pinch dies which hold the blank during the head forming operation. The pinch dies are formed with cavities therein to properly shape the head. The downward motion of each blank is arrested by coming into contact with a heading die which is arranged to be adjusted a predetermined distance below the pinch die to suit the desired size of head to be produced. The pinch dies serve the double function of holding the nail and shaping the head. While the blank is in the grip of the pinch dies the heading die is caused to move upwardly under influence of a power driven mechanism; thus the butt end of the blank is subjected to a powerful squeezing action which upsets said butt end and forces the metal thereof into the recesses in the pinch dies. Thus a head of accurately controlled size and shape is positively upset on each nail blank by a squeezing action as distinguished from a hammer blow.

Upon completion of the heading operation the heading die is swung laterally to one side and the grip of the pinch dies on the blank is released. The same pusher rod which feeds the nail longitudinally through the orienting device again comes into play and gives the completed nail released by the pinch dies a downward impetus, thus positively freeing the completed nail from the pinch dies in the event it should have any tendency to stick therein. As the heading die swings out of the path of the nail to permit ejection thereof, a discharge chute automatically swings into alignment with the head forming aperture in the pinch die to thus be in position to receive the discharged nail and direct it to a suitable storage or shipping receptacle, such as a nail keg or the like supported on the floor or on a suitable stand in juxtaposition to the outlet ends of the discharge chutes.

Main drive

Having above concisely set forth the chief functional characteristics of the machine embodying the present invention, we will now describe in greater detail improved features of design, construction and coordination of specific mechanisms, the practicability and advantages of which have been demonstrated by an actual reduction to practice.

Referring in detail to the drawings, the numeral 10 represents the main drive shaft of the machine which at its outer end carries a loose pulley 12 and a tight pulley 14, the latter being driven by a belt from a suitable motor, not shown. The shaft 10 is mounted in anti-friction bearings 16 and 18 carried by bearing retainers secured to the side walls 20 and 22 of the main frame housing indicated as a whole at 24. The main shaft carries a main drive pinion 26 which meshes with and drives a large gear 28 secured to a lower cam shaft 30. The gear 28 in turn meshes with a gear 32 secured to a crankshaft 34 which is mounted in anti-friction bearings 36 and 38 supported by the side walls 20 and 22 of the main frame. The crankshaft at one end has a flywheel 39 keyed thereto by means of which the machine can be turned over by hand in making initial adjustments to suit requirements in making different sizes and types of nails. The gear 32 meshes with a gear 33 secured to an upper cam shaft 40 which is mounted in suitable anti-friction bearings 42 and 44 carried by the side walls 20 and 22 on the main housing 24.

The gears 28 and 33 are of equal diameter, which diameter is twice that of the gear 32. Thus it is apparent that the crankshaft 34 makes two revolutions while the upper and lower cam shafts 30 and 40 each makes a single revolution. This two-to-one ratio is desirable for proper coordination and timing of interdependent mechanisms hereinafter referred to largely for the reason that for each two strokes of the crank 46, two separate nail blanks are formed and acted upon by substantially duplicate mechanisms reversely arranged symmetrically on opposite sides of the vertical center line of the machine as viewed endwise.

The machine of the present invention is peculiarly well suited for forming cut nails from nail stock fed from a ribbon-like coil. Such coiled stock is frequently a by-product of mills rolling flat steel products and the stock can be best accumulated and stored in coiled form. However, the coiling of the stock presents a problem in the formation of nails since different portions of the coil are of varying degrees of curvature. For this reason the machine of the present invention incorporates as an important component part thereof, straightening instrumentalities. More specifically, a supply coil 48 of ribbon-like nail stock is supported on a conventional form of reel or spool 50. From the spool or reel the coiled ribbon-like stock is fed off on a tangent between a pair of spaced upright guide posts 52 and 54 which are provided with threaded shanks carrying clamp bolts which secure them to a fixed cross member 56. Lower straightener rolls 58 and 60 are rotatably supported in a bracket 62 and coacting therewith is an upper straightener roller 64 which is mounted midway between the axes of rotation of rollers 58 and 60. The roller 64 is carried in vertically adjustable bearings 66 whose position can be adjusted by manipulation of adjusting screws 68 so as to properly set the straightening roll to suit the gauge of ribbon-like nail stock being handled.

The straightening mechanism also functions to create a drag or back tension on the ribbon-like stock in such a way that for each stroke of a feed member a predetermined increment of nail stock will be advanced with great precision to a shear so as to produce a nail blank of the desired size. After the strip of nail stock leaves the straightening rollers 58, 60 and 64, it passes below a hold-down roll 70 which is effective to counteract any tendency of the strip to curl upwardly under the action of the straightening rolls.

For feeding the strip of nail stock forwardly in uniform increments, which increments are capable of variation to suit different sizes of blanks to be produced, there is provided a feed lever 72 carried by a rock shaft 74 mounted in suitable bearings in the side walls of the main frame.

The feed lever 72 at its upper end carries a pivot pin 76 on which is mounted a feed dog 78, the lower extremity of which is curved and serrated to form feed teeth, as shown. The dog has an upward extension 80 for coaction with a manual release handle 82 which when rocked about the axis of the pivot pin 76 throws the dog out of operative position so as to permit of an initial manual setting of the strip.

Surrounding the hub portion of the dog there is a torsion spring 84, the free ends of which bear respectively against the dog and a pin 86 carried by the feed lever, the arrangement being such that the spring normally tends to hold the teeth of the feed dog in engagement with the strip of nail stock. A similar spring 88 serves to normally hold the release handle 82 in the position shown in Figures 2 and 11 where it has no effect on the operation of the dog. The feed lever 72 derives its motion from a pitman 90 which is actuated by the crank 46. The pitman carries a pin 92 to which is connected a link 94 in turn connected by a pin 96 with a link 98 and a hanger arm 100, the latter being pivoted to a rock shaft 102 carried by a fixed bracket 104. At its forward end the link 98 is connected by a pin 106 with a lever 108 which in turn is pivoted at 110. The lever has an elongated slot 112 therein in which is slidably mounted a block 114 carrying a pin 116 forming an adjustable connection with a link 118 whose forward end carries a pin 120 connected to the lower extremity of the feed lever 72. As thus constructed and arranged it is apparent that by adjusting the block 114 at different points lengthwise in the slot 112 the constant throw of the crank 46 can be made effective to feed different increments of nail stock. Thus a given machine can be readily adjusted to produce nails of different sizes.

When the feed lever 72 is rocked in one direction, the teeth of the feed dog 78 in cooperation with complementary teeth 122 formed on the feed lever will firmly grip the nail stock and move it past a holding dog 124 which is pivoted on a stud 126. This holding dog is of substantially the same construction as the feed dog, it being noted, however, that it is a passive member since its mounting pin 126 is stationary. It is provided with a manual release lever 128 which is only occasionally manipulated when making initial manual adjustments. The normal function of the dog 124 is to prevent retraction of the strip as the feed dog 78 makes its back stroke after each desired increment of nail stock has been fed forward.

*Blank shearing*

As each increment of nail stock is fed forwardly, a vertically reciprocating shear 130 in coaction with a coacting blade 131 severs a nail blank therefrom. The shear is secured by a tap bolt 132 to a shear holder 134 which is slidably mounted in an oscillating frame 136 having a cylindrical portion 138 fitted within a cylindrical bearing socket 140 and set on a wear ring 142 screwed to the main frame of the machine. The oscillating frame is removably held in position by a retainer ring 144 secured to the frame by cap screws or other suitable fastening devices. Oscillating motion is periodically imparted to the frame 136 by means of a cam 146 carried by the upper cam shaft 40 through cam follower 148 and an arm 150 suitably secured to the oscillating frame 136.

Springs 152—152 are seated in suitable spring sockets formed in the oscillating frame 136 and act upwardly on the underside of a flange 154 forming part of the shear holder 134. The oscillating mounting for the shear holder, together with the cam 146 and related described parts, provide means whereby upon successive vertical reciprocations of the shear oppositely converging nail blanks will be sheared, for example, as indicated by the broken lines a, b, c, d, e, etc. in Figure 13. Thus upon one down stroke of the shear blade a nail blank such as shown at N in Figure 14 will be produced with its opposite cut edges converging or tapering in one direction. Upon the next down stroke another nail blank N', such as shown in Figure 15, will be produced with its cut faces converging or tapering in the opposite direction.

Since the shear holder partakes of both an oscillating motion in a horizontal plane and a reciprocating motion in a vertical plane, special means are required to transmit power movement thereto. This means, which automatically compensates for the compound movements of the parts, includes a shear push rod 158, the lower surface 160 of which corresponds to a segment of a sphere. This surface makes a working contact with a spherelike seat 162 formed in the upper portion of the shear holder 134. The shear push rod 158 at its upper end is pivotally connected to an operating pin 164 secured to the forward arm 166 of a shear actuated walking beam 168 mounted on a rock shaft 170. At its rear extremity the walking beam carries a wrist pin 172 through which motion is transmitted from the above mentioned pitman 90 which in turn is actuated by the crank 46.

With the construction and arrangement as above described, it will be apparent that on one down stroke of the shear blade the forward end of the blank will be severed on a line inclined in one direction, for example, at the inclination indicated by line a in Figure 13. Thereafter the cam 146 will oscillate the shear holder acting through the arm 150 so that upon the next down stroke of the shear the blank will be severed along an oppositely inclined line such, for example, as that indicated at b in Figure 13. Thus, said first two strokes of the shear blade will produce a nail blank tapering in the direction shown in Figure 14. Before the next down stroke of the shear blade its holder will be oscillated so as to shear the blank along the line indicated at c in Figure 13. Thus a nail blank such as shown in Figure 15 will then be produced which tapers in the opposite direction to that shown in Figure 14. In short, after each cutting stroke of the shear the angularity thereof is reversed so that succeeding nail blanks are produced which taper in opposite directions.

*Blank transfer mechanism*

Means to be now described are provided for moving in succession the oppositely tapered horizontal nail blanks from the horizontal positions in which they are sheared to the respective heading stations where they are momentarily held in vertically disposed positions. The heading stations are symmetrically located in opposite sides of a vertical plane passing through the median axis of the advancing nail stock. As thus arranged, although succeeding blanks as sheared taper in opposite directions, they all finally arrive at respective heading stations in such position that their butt ends are lowermost and they therefore taper upwardly.

Since the transfer mechanism, heading mechanism and deflecting mechanism is duplicated in opposite hand or reverse arrangement on opposite sides of the machine, it is only necessary to specifically describe the mechanism at one side of the center line. Accordingly, a description of the parts on one side will apply to like parts shown on both sides of the center line and the same reference characters have been applied to the reversely arranged duplicate parts.

The cams for actuating the parts can be set so that their active portions are spaced apart approximately 180 degrees so as to cause the respective transfer means, gripping means, heading means and deflecting means to operate in proper timed sequence. The cams are shown in proper timed relationship in the several drawings.

As each nail blank is sheared it falls into an open ended chamber 174 formed in a blank receiving member 176 adjustably clamped to a rod-like extension 175 carried by a transfer arm 178 which is loosely pivoted to a rock shaft 180, and actuated thereby through lever 181 keyed to said rock shaft and a spring loaded toggle link consisting of telescopically engaging members 183 and 185 pivotally connected by pins 187 and 189 respectively with the lever 181 and the transfer arm 178. The member 183 includes a tubular sleeve portion 191 within which the shank portion 193 of the member 185 is slidably telescoped. A compression spring 195 normally holds the parts in the full line position best shown at the left in Figure 6. Thus the parts shown yieldingly connect the transfer arm 178 with the shaft 180.

These yielding connections provide means to prevent damage to the machine in those rare instances when a nail blank becomes wedged or jammed in the orienting guide or pinch dies to be later described. With the yielding telescopic mechanism shown and described, when a nail blank jams the machine the shaft 180 and arm 181 can rock back and forth without moving the transfer arm 178. Thus breakage of the machine parts is prevented when either accidental or malicious jamming of the blanks in the machine occurs. After stoppage of the machine and removal of the accidentally wedged blanks, the parts are readily restored to normal operating condition.

Each member 176 is made of non-magnetic material, such as brass, to facilitate ejecting the steel nail blanks after they have been transferred to a desired position. An adjustable stop screw 197 controls the stopping point or throw of the transfer arm 178. Thus the chamber 174 is aligned accurately with the longitudinal nail blank passageway 208 of the orienting means to be presently described.

For impositively holding the nail blank in the open ended chamber 174, each member 176 is provided with a plurality of permanent magnets 182 and soft steel inserts 182a by which the blanks are impositively held. Thus when the transfer arm is swung from its horizontal nail blank-receiving position (illustrated at the right in Figure 6) to the substantially vertical nail blank-discharging position (shown at the left in Figure 6), the blank will be magnetically restrained or prevented from flying out of the open ended chamber 174 under the influence of either gravity or centrifugal force. When the member 176 carried by the transfer arm is in the top or horizontal position of Figure 6, said member is directly under the shear blade and is ready to receive a blank immediately after it is cut from the intermittently advancing strip of stock. One extension 201 of the member 176 terminates within a short distance of a safety stop 203 adapted to engage the strip just prior to the time it is severed to form each blank. Another extension 205 is beveled at 207 to guide the severed nail blank into the chamber 174 where it is impositively held by the magnet attraction of the magnets described.

Figure 4:
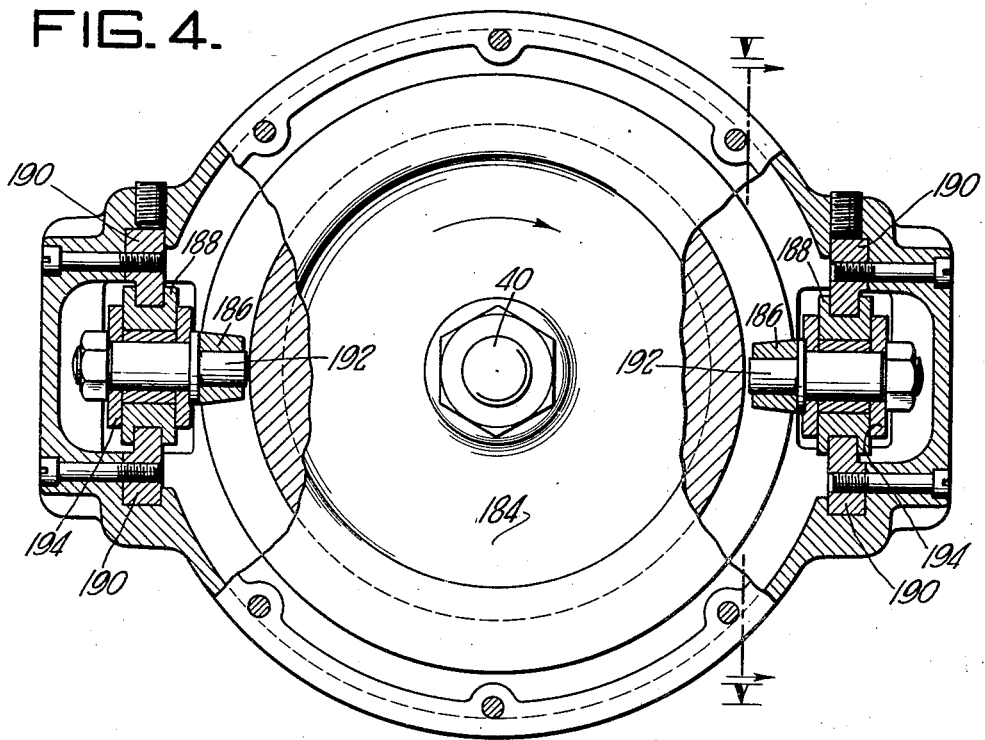
Figure 4 is a fragmentary detail section on line IV—IV of Figure 3.
Figure 5:
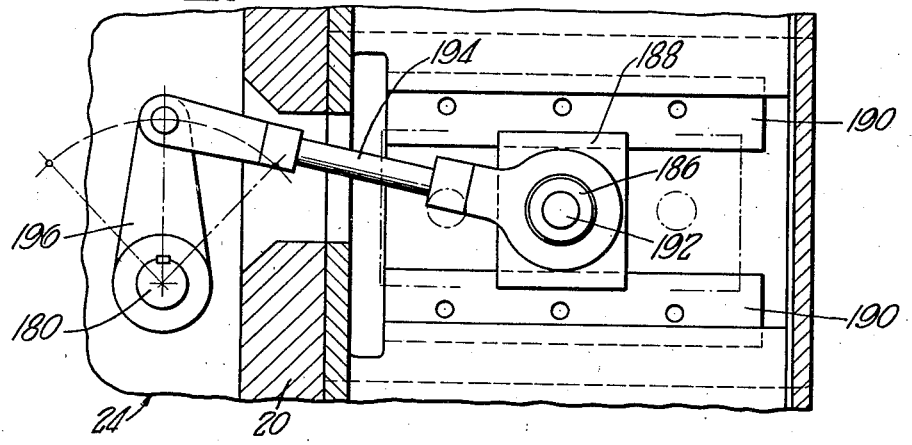
Figure 5 is a detail section on line V—V of Figure 4.

A single race cam 184, best shown in Figures 3 and 4, secured to the upper cam shaft 40 serves to actuate both transfer arm rock shafts 189. Riding in the raceway of the cam 184 are respective follower rollers 186 pivotally supported on slide blocks 188 (Figure 4) which ride on suitable guide bars 190 secured to the fixed frame structure of the machine. Each slide block 188 is connected by means of a pin 192 and a link 194 with a transfer rock shaft operating lever 196. Thus it is clear that since the rollers 186 engage the cam at points spaced 180 degrees apart, each rotation thereof will first move one transfer arm from the horizontal blank-receiving position to the vertical blank-discharge position at predetermined periodic time intervals.

*Blank orienting*

To insure that the blanks are properly oriented for coaction with nail gripping and head forming instrumentalities, special means are provided. These means include respective orienting devices indicated generally at 198 located respectively on opposite sides of the vertical center line of the machine. Each orienting device includes a demountable bushing 200 which is rotatably adjustable in a socket 202 formed in the rigid cross member 204 of the machine. Each bushing 200 carries a plurality of orienting rollers 206 which are yieldingly pressed inwardly toward the central axis of the nail blank-receiving passageway 208 formed in the bushing by means of respective springs 210. The function of the spring loaded rollers 206 is to positively turn or orient each nail blank as it is forced through the respective bushings 200 so as to properly position the blank for engagement in a predetermined manner by the gripping faces of coacting pairs of pinch dies 240 and 242 to be later described. For example, in some instances it is desirable that said pinch dies shall contact the opposite parallel flat faces on the region of the butt end of the nail blank. In other instances, the machine may be set so that the nail blank will be oriented to permit the pinch dies to engage the tapering or sheared edge faces of the blank. This change of orientation of the blank can be effected by merely rotating the bushing 200 and locking it in another position in its socket 202. A suitable locking pin 212 engaging a notch 213 formed in the flange of the bushing and entering a hole in the frame member 204 will prevent the inadvertent turning of the bushing and will positively hold it in either of its desired predetermined positions of adjustment. Each orienting bushing 200, as shown in Figure 17, is recessed at 200a to accommodate the oppositely positioned springs 210 and rollers 206 which are thus yieldingly pressed inwardly to positions determined by the locations of notched seats 200b in which the rollers are adapted to turn as the nail blanks are moved longitudinally through the bushing passageway 208. A sleeve 200c secured to the bushing surrounds the springs and rollers and makes a working fit with the socket 202. As shown in Figure 19, the orienting bushing is positioned so that a center line $y$—$y$ passing through the longitudinal axial center thereof, the center of the locking pin 212 and is perpendicular to the end gripping faces of the pinch dies, which faces are parallel with the lines $z$—$z$ (Figure 19). In the position of adjustment illustrated the axes of the rollers will be parallel to the line $x$—$x$ which is about 45 degrees from the lines $y$—$y$ and $z$—$z$. The pin 212 and notch 213 serve to properly position the orienting bushing 200 so the rollers 206 are at the desired angle to the pinch die faces. The angular disposition of the rollers shown as parallel to the line $x$—$x$ is such that when the pinch dies close in on the nail blank they will turn it slightly about its longitudinal axis and finally forcibly grip the parallel wide faces thereof. By manually turning the bushing 200 axially in its socket 202 and locking it in a different predetermined angular position, the nail blanks can be so oriented that the pinch dies will forcibly grip the converging or tapered edges of the nail blanks. Thus the style or type of head to be formed can be varied to suit varying requirements. Practical operation has demonstrated that the nail blanks are less likely to become jammed in the machine when they are so oriented as to be disposed at an angle to the faces of the pinch dies than when they are fed with such faces parallel thereto. The yielding spring pressure of the rollers 206, as the blank is turned, permits the wide faces to contact and align with the faces of the pinch dies when the latter move into gripping engagement with the blank.

When the transfer arm is in the vertical position illustrated at the left in Figure 6, a respective ejector rod 214 is moved vertically downward to positively force the nail blank through the orienting guide bushing 200, thus compelling the rollers 206 to positively turn or orient the nail blank into a desired predetermined position for engagement with either the parallel side faces of the blank or with the tapering cut edges thereof which are about perpendicular to said side faces.

The ejector rod 214 is reciprocated vertically by a lever 216 (Figures 2 and 11) whose forked end 218 engages a pin 220 extending laterally from the rod. The operating lever 216 is pivotally mounted at 222 to an upstanding lug formed on a top plate or other fixed part of the machine structure. Each operating lever 216 is actuated by a respective cam 224 (Figure 3) carried by the upper cam shaft 40, motion being transmitted through a cam follower 226 and links 228 and 230, the latter link being connected by a pin 232 to the lever 216 and the link 228 being pivotally mounted on a pin 234 secured to a fixed lug depending from the top plate of the machine as shown in Figure 2. The rod 214 is yieldingly held in position by means of a spring loaded rod 236 pivotally connected at 238 to the lever 216. The spring loaded rod also serves to hold the cam roller 226 in contact with the cam 224.

*Head forming mechanism*

After the nail blanks are properly oriented in a substantially vertical upright position with their butt ends lowermost, heads are formed on the butt ends by the joint cooperation of respective pinch dies and heading dies; there being a set of pinch dies and a heading die located on each side of the center line of the machine. The pinch dies comprise a coacting pair of pinch die elements 240 and 242. The pinch die 240 is normally held in a fixed position which, however, can be laterally adjusted by manipulation of a threaded adjusting screw 244. The gripping faces 246 and 248 of the pinch dies may be arranged to engage either the parallel flat faces of the nail blanks N—N' or the tapering cut edges thereof. The recesses 250 and 252 formed in the end faces of the pinch dies are specially designed and adapted to form a nail head on the butt end of the blank of any desired shape.

The movable pinch die 242 is slidably mounted so that it can partake of a horizontal movement toward and from the normally fixed pinch die 240. For imparting such sliding movement there is provided an oscillating lever 254, the upper portion of which is rounded for engagement with the parallel upright walls of a notch 256 formed in the pinch die 242. The lever is pivotally mounted on a stub shaft 258 suitably secured to any suitable fixed part of the machine frame structure. Motion is transmitted to the pinch die operating lever 254 by a cam 260 secured to the lower cam shaft 30, this cam coacting with a roller 262 carried by a lever 264 pivoted to a rock shaft 266. The lever 264 has an upwardly extended arm 268 to the extremity of which is connected a cable 270. The cable is connected to a disc 272 which coacts with a spring 274 housed in a casing 276. As thus arranged, the spring tends to force the roller 262 into firm engagement with the cam 260, thus tending to turn the arm 264 counterclockwise, as viewed in Figure 2.

Depending downwardly from the hub of lever 264 there is a lug 278 carrying an adjustable screw 280 having a rounded end 282 seated against a socket formed at one end of a thrust rod 284. The opposite end of said thrust rod is socketed at 286 for engagement with a round headed stud 288 secured to the lower extremity of the pinch die operating lever 254. Thus counterclockwise movement imparted to the lever 264, as viewed in Figure 2, imparts counterclockwise movement to the lever 254 tending to move the pinch die 242 to retracted or open position. The active face of the cam 260 rocks the arm 264 in a clockwise direction, overcoming the tension of spring 274, thus transmitting clockwise rocking movement to the arm 254 through an adjustable abutment screw 300 carried by a lug 302 formed on the hub of lever 264. This screw 300 has a rounded face 304 which engages a socket formed at one end of a thrust rod 306 whose opposite end is socketed for engagement with a round headed abutment stud 308 secured to the outer face of the movable pinch die 242. Upon each revolution of the lower cam shaft 30, the respective cams 260 will impart opening and closing movements to the respective pairs of coacting pinch dies located on opposite sides of the center line of the machine at suitably timed intervals so as to release and grip successive nail blanks for the purpose of forming heads thereon.

When a given nail blank is ejected from the orienting bushing 200 the butt end of the blank will come to rest against a heading die 310. The upper head forming face of the heading die is adapted to be located with precision a predetermined distance below the plane of the lower faces of the pinch dies 240 and 242 so as to form a head of predetermined size. The heading die 310 is preferably formed of high grade wear resisting metal detachably secured to a vertically disposed rod 312 which is slidable vertically in the bore 314 formed in a laterally swinging heading die carrier 316. A spring 318 located in an enlarged portion of the bore 314 surrounds the rod 312 and presses against a collar 320 secured to the rod. The collar engages the extremity of a bushing 322 secured to the lower portion of the carrier 316. As thus arranged the spring yieldingly holds the upper face of the heading die a predetermined distance from the underside of the pinch dies and by varying the adjustment of the bushing 322, which is threaded into the carrier, it will be appreciated that adjustments can be made whereby the size of the nail head formed can be varied to suit requirements of different types of nails. In order to upset a head on the nail blank the butt end portion thereof is subjected to a powerful squeezing operation, as distinguished from a hammer blow, since the heading pressure on the die 310 is gradually yet very forcefully applied from the very instant that the heading die starts to move upwardly, it being remembered that the nail blank came to rest against the top surface of the heading die immediately upon ejection from the orienting device. The powerful upsetting pressures on the respective heading dies are transmitted through respective sturdy cams 324 carried by the lower cam shaft 30.

Preferably, but not necessarily, the active face or rise portion 326 constituting the heading stroke rise portion of the cam may correspond to a mathematical curve precalculated to exert the desired gradual powerful pressure. For example, the active cam rise curvature may correspond to a portion of a parabola. Each respective cam 324 coacts with a respective follower 328 carried at the outer end of a heading die operating lever 330 secured to a rock shaft 332 pivotally mounted in suitable fixed bearings. Extending from the hub of the lever 330 is a short arm 334 having an adjustable tappet 336 secured thereto which can be locked in different positions of vertical adjustment by manipulation of the lock nut 338. This adjustment permits compensating for minute variations in stroke necessitated by the formation of heads of different sizes and also provides for compensating for wear on the working face of the tappet or the die. From the drawings it is apparent that when the active face of the cam 324 comes into contact with the follower 328 the arm 330 will be rocked counterclockwise, thus forcing the tappet 336 upwardly and transmitting a gradual yet powerful heading movement to the die 310 in such a way as to upset the stock at the butt end of the blank and force it into the recesses 250 and 252 of the pinch dies. A spring 340 interposed between the top plate of the machine and a disc 342 acts through a cable 344 which is connected by a shackle pin 346 in a manner to rock said lever in a clockwise direction and thus withdraw the tappet after completion of its heading stroke a distance determined by the contour of the cam 324. When the tappet is retracted it will be understood that the spring 318 in the cavity 320 of the heading die carrier will retract the heading die in a vertical direction to starting position to arrest the downward travel of the next nail blank to be headed.

After each head is upset on the butt end of each nail blank, the heading die 310 is swung laterally in a horizontal plane to a position sufficiently remote from the line of vertical movement of the blanks to permit them to be readily ejected upon release of the pinch dies. It is for this reason that the heading die 310 is carried in a swingable carrier 316. Each respective carrier 316 has a hub portion 348 journaled on a vertical bearing stud 350. Each hub 348 is provided with a laterally extending arm 352 into which is threaded a screw 354 having a rounded head 356 engaging a similarly rounded socket 358 formed in the extremity of a push rod 360. The push rod 360 carries a cam follower 362 which coacts with a cam 364 secured to the lower cam shaft 30. The push rod 360 is connected by means of a pin 366 with a supporting arm 368 pivoted on a stud 370 secured to any part of the fixed frame structure of the machine. As thus arranged, upon rotation of the cam 364 the active face thereof will shift the push rod 360 to the right in Figure 2. Thus the carrier will be rocked about the vertical axis of the stud 350 so as to swing the heading die out of alignment with the completed nail held by the pinch dies.

Each die carrier 316 supports an inclined trough-like discharge chute 372 which is effective to receive the completed nail upon release of the pinch dies and direct it to a suitable shipping or storage receptacle such as a nail keg or crate. Thus it is apparent that the same motion which shifts each respective heading die out of alignment with the nail held by the pinch dies also moves the discharge chute into position to receive the completed nail when the pinch dies release it. When releasing movement is imparted to the pinch dies the same ejector rod 214 which forces the nail blank through the orienting device has a further movement imparted thereto which is effective to strike a quick blow to the upper end of the completed nail so as to positively free it from the released pinch dies. Thus a discharging impetus is given to the completed nail upon release of the pinch dies.

*Summary*

From the foregoing detailed disclosure it is apparent that the machine illustrated will accomplish the various objects set forth in the opening paragraphs of the specification. To recapitulate, in short, the disclosed mechanism is capable of feeding coiled stock, straightening the same and advancing it in uniform increments, which may be varied to suit requirements, to a shearing station where oppositely tapering nail blanks which are sheared from a horizontally disposed piece of stock are transferred to respective coacting pinch dies, the same being properly oriented therewith while en route thereto. The pinch dies, in cooperation with the described heading dies and the respective operating instrumentalities associated therewith, are effective to exert a squeezing action on the butt end of each nail blank so as to rapidly and accurately form a head thereon. Immediately after the formation of the head each heading die moves laterally to one side so as to clear the way for ejection of the completed nail upon the release of the pinch dies, whereupon the ejector push rod comes into play to positively eject the completed nail into a discharge chute which was moved into nail receiving position simultaneously with the motion of the heading die away from its heading position. Thus the chute directs each completed nail to a receptacle, such as a shipping keg or the like.

Although the detailed disclosure defines with great particularity a design and arrangement of mutually interdependent coacting instrumentalities which a reduction to practice shows is highly desirable and efficient on a production basis, it is not to be construed that we are limited thereto since a wide range of mechanical equivalents may be substituted for some of the instrumentalities set forth, and various modifications in structure and arrangement may be made without departure from the spirit and scope of the invention as defined in the appended claims.

We claim:

1. A cut nail machine comprising, in combination, means for supporting a coiled supply of ribbon-like nail stock, straightening means for flattening such nail stock, means for intermittently feeding predetermined increments of straightened nail stock from said supply means to a shearing station, a shear blade at said station, an oscillating mounting for said shear blade, means for periodically oscillating said mounting in opposite directions to thus periodically vary the angularity of said blade, and a member for reciprocating said blade in each of its angular positions whereby oppositely tapered nail blanks are cut in regular sequence from said intermittently advancing flattened stock.

2. In a cut nail machine of the class described, a movable transfer element having a blank-receiving open ended chamber, means for impositively holding nail blanks in said chamber, and means for moving the transfer element from a substantially horizontal blank-receiving position to a substantially vertical blank-discharging position.

3. In a cut nail machine of the class described, a movable transfer element having a blank-receiving open ended chamber, magnetic means for impositively holding nail blanks in said chamber, and means for moving the transfer element from a blank receiving position to a blank discharging position.

4. In a cut nail machine of the class described, a pair of coacting pinch dies, an orienting guide bushing having a vertical passageway therethrough, and spring-pressed rollers therein set to position the desired faces of the nail blank at a predetermined angle relatively to the gripping faces of said dies.

5. In a cut nail machine of the class described, a pair of coacting pinch dies, an orienting guide bushing having a vertical passageway therethrough, spring-pressed rollers therein set to position the desired faces of the nail blank at a predetermined angle relatively to the gripping faces of said dies, and means for positively forcing nail blanks longitudinally through said bushing and into coaction with said rollers.

6. In a cut nail machine of the class described, a normally fixed pinch die having a nail blank gripping face recessed to conform substantially to the desired nail head shape, means for adjustably positioning the nail engaging face of said die in various predetermined positions, a similarly recessed movable pinch die mounted for coaction with said fixed die, means for positively moving the movable die toward and from the fixed die to periodically grip and release nail blanks, orienting means effective to positively turn each nail blank to a predetermined position for engagement with said pinch dies, and means for moving nail blanks through said orienting means.

7. A cut nail machine comprising, in combination, means for supporting a coiled supply of ribbon-like nail stock, straightening means for flattening coiled stock fed from said supporting means, means for intermittently feeding predetermined increments of straightened nail stock to a shearing station, a shear blade at said station, an oscillating mounting for said shear blade, means for periodically oscillating said mounting in opposite directions to thus periodically vary the angularity of said blade, a member for reciprocating said blade in each of its angular positions whereby oppositely tapered nail blanks are cut in regular sequence from said intermittently advancing flattened stock, respective transfer elements, means for moving each transfer element to nail blank-receiving and discharging positions, respective pairs of coacting pinch dies arranged to receive the butt end of each nail blank delivered by each transfer element, respective heading dies against which the butt ends of said blanks rest while in the grip of said pinch dies, and respective means for forcing each heading die toward a respective pair of said pinch dies whereby a head is formed on each blank held thereby.

8. A cut nail machine comprising, in combination, means for supporting a coiled supply of ribbon-like nail stock, straightening means for flattening coiled stock fed from said supporting means, means for intermittently feeding predetermined increments of straightened nail stock to a shearing station, a shear blade at said station, an oscillating mounting for said shear blade, means for periodically oscillating said mounting in opposite directions to thus periodically vary the angularity of said blade, a member for reciprocating said blade in each of its angular positions whereby oppositely tapered nail blanks are cut in regular sequence from said intermittently advancing flattened stock, respective transfer elements, means for moving each transfer element to nail blank-receiving and discharging positions, respective pairs of coacting pinch dies arranged to receive the butt end of each nail blank delivered by each transfer element, respective heading dies against which the butt ends of said blanks rest while in the grip of said pinch dies, respective power means for forcing each heading die toward a respective pair of said pinch dies whereby a head is formed on each blank held thereby, and respective means for positively orienting each nail blank after it leaves the transfer element so as to properly juxtapose it in a predetermined position with respect to said pinch dies.

9. A cut nail machine comprising, in combination, means for supporting a coiled supply of ribbon-like nail stock, straightening means for flattening coiled stock fed from said supporting means, means for intermittently feeding predetermined increments of straightened stock to a shearing station, a shear blade at said station, an oscillating mounting for said shear blade, means for periodically oscillating said mounting in opposite directions to thus periodically vary the angularity of said blade, a power actuated member for reciprocating said blade in each of its angular positions whereby oppositely tapered nail blanks are cut in regular sequence from said intermittently advanced flattened stock, respective transfer elements, means for moving each transfer element to nail blank-receiving and discharging positions, respective pairs of coacting pinch dies arranged to receive the butt end of each nail blank delivered by each transfer element, respective heading dies against which the butt ends of said blanks rest just prior to being gripped by said pinch dies, respective power means for forcing each heading die toward a respective pair of said pinch dies whereby a head is formed on each blank held thereby, a nail blank orienting means including spring-pressed guide elements, and means for pushing said nail blanks endwise through orienting means.

10. A cut nail machine comprising, in combination, feed means for intermittently advancing predetermined increments of flat ribbon-like nail stock to a shearing station, a shear at said station, an oscillating mounting for said shear, means for periodically oscillating said mounting in opposite directions to thus periodically vary the angularity of said shear, a power actuated member for reciprocating said shear in each of its angular positions whereby oppositely tapered nail blanks are cut in regular sequence from said intermittently advancing flattened stock, respective transfer elements, means for moving each transfer element to angularly disposed nail blank-receiving and discharging positions, respective means for orienting blanks discharged by each transfer element, respective pairs of coacting pinch dies having head defining recesses therein, respective heading dies, respective means for shifting said heading dies laterally into and out of alignment with the head defining recesses of the pinch dies, and respective heading die actuating means for forcibly squeezing the butt ends of nail blanks into the recesses in said pinch dies to thus form upset nail heads on said blanks.

11. A cut nail machine comprising, in combination, feed means for intermittently advancing predetermined increments of flat ribbon-like nail stock to a shearing station, a shear at said station, an oscillating mounting for said shear, means for periodically oscillating said mounting in opposite directions to thus periodically vary the angularity of said shear, a power actuated member for reciprocating said shear in each of its angular positions whereby oppositely tapered nail blanks are cut in regular sequence from said intermittently advancing flattened stock, respective transfer elements, means for moving each transfer element to angularly disposed nail blank-receiving and discharging positions, respective means for orienting blanks discharged by each transfer element, respective pairs of coacting pinch dies having head defining recesses therein, respective heading dies, respective means for shifting said heading dies laterally into and out of alignment with the blank engaging zone of the pinch dies, and respective heading die actuating means for forcibly squeezing the butt ends of nail blanks into the recesses in said pinch dies to thus form upset nail heads on said blanks, and respective reciprocating means for positively ejecting the thus headed nails from said pinch dies after the heading dies have been shifted laterally out of line with the pinch die cavities.

12. A cut nail machine comprising, in combination, feed means for intermittently advancing predetermined increments of flat ribbon-like nail stock to a shearing station, a shear blade at said station, an oscillating mounting for said shear blade, means for periodically oscillating said mounting in opposite directions to thus periodically vary the angularity of said blade, a power actuated member for reciprocating said blade in each of its angular positions whereby oppositely tapered nail blanks are cut in regular sequence from said intermittently advancing flattened stock, respective transfer elements, means for moving each transfer element to angularly disposed nail blank-receiving and discharging positions, respective means for orienting blanks discharged by each transfer element, respective pairs of coacting pinch dies having head defining recesses therein, respective heading dies, respective means for shifting said heading dies laterally into and out of alignment with the blank engaging zone of the pinch dies, respective heading die actuating means for forcibly squeezing the butt ends of nail blanks into the recesses in said pinch dies to thus form upset nail heads on said blanks, respective means for separating each coacting pair of pinch dies to thus release the headed nails, and respective discharge chutes swingable into position to receive nails released upon separation of the pinch dies effective to direct the nails to a storage receptacle.

13. A cut nail machine comprising, in combination, means for guiding a flat strip in a horizontal plane, toothed feeding means for advancing said strip in predetermined increments to a shearing station, a vertically reciprocable shear blade at said station, an oscillating mounting for said shear blade, means for periodically oscillating said mounting in opposite directions to thus periodically vary the angularity of said blade, a power actuated member for reciprocating said blade in each of its angular positions whereby oppositely tapered nail blanks are cut in regular sequence from said intermittently advancing strip, a transfer element having an open ended chamber to receive a blank immediately after it is sheared from said strip of stock, magnetic means for impositively retaining the blank in said chamber, means for swinging the transfer element to a substantially vertical position, means for vertically ejecting the blank from the chamber in said element after it has been swung to the vertical, means for turning the blank about its vertical axis so as to orient either the tapered edges or the parallel faces thereof in predetermined directions, coacting pinch dies effective to grip the butt portion of said blank, a heading die swingable laterally in a horizontal plane below said pinch dies and against which the extreme butt end of said blank comes to rest when ejected from said transfer member, and a power actuated member for squeezing the butt end of said blank between said heading die and said pinch dies to thus upset a head thereon.

14. A cut nail machine comprising, in combination, means for guiding a flat strip in a horizontal plane, toothed feeding means for advancing said strip in predetermined increments to a shearing station, a vertically reciprocable shear blade at said station, an oscillating mounting for said shear blade, means for periodically oscillating said mounting in opposite directions to thus periodically vary the angularity of said blade, a power actuated member for reciprocating said blade in each of its angular positions whereby oppositely tapered nail blanks are cut in regular sequence from said intermittently advancing strip, a transfer element having an open ended chamber to receive a blank immediately after it is sheared from said strip of stock, magnetic means for impositively retaining the blank in said chamber, means for swinging the transfer element to a substantially vertical position, means for vertically ejecting the blank from the chamber in said element after it has been swung to the vertical, means for turning the blank about its vertical axis so as to orient either the tapered edges or the parallel faces thereof in predetermined directions, coacting pinch dies effective to grip the butt portion of said blank, a heading die swingable laterally in a horizontal plane below said pinch dies and against which the extreme butt end of said blank comes to rest when ejected from the transfer member, a power actuated member for squeezing the butt end of said blank between said heading die and said pinch dies to thus upset a head thereon, means releasing the grip of said pinch dies on the blank, and a discharge chute swingable to position to receive the headed nail upon release of said pinch dies and guide it to a storage receptacle.

15. A cut nail machine comprising, in combination, feed means for intermittently advancing predetermined increments of flat ribbon-like nail stock to a shearing station, said strip of nail stock being horizontally disposed and said blade reciprocating vertically, a transfer element swingable through a right angle and effective to receive a nail blank in a horizontal position as sheared from said strip and transpose it to vertical position, means impositively retaining the blank in said transfer element, a nail blank orienting member positioned to receive a cut nail blank from said transfer member, means for forcing said blank through said orienting member so as to positively bring it into a predetermined desired position, pinch dies for engaging the thus oriented blank, a heading die movable laterally into and out of endwise alignment with said blank, means for forcing said heading die against the butt end of the nail blank while it is held by said pinch dies to thus form a head on the blank, and means for releasing the thus headed nail from said dies.

16. A cut nail machine comprising, in combination, feed means for intermittently advancing predetermined increments of flat ribbon-like nail stock to a shearing station, said strip of nail stock being horizontally disposed and said blade reciprocating vertically, a transfer element swingable through a right angle and effective to receive a nail blank in a horizontal position as sheared from said strip and transpose it to vertical position, means impositively retaining the blank in said transfer element, a nail blank orienting member positioned to receive a cut nail blank from said transfer member, means for forcing said blank through said orienting member so as to positively bring it into a predetermined desired position, pinch dies for engaging the thus oriented blank, a heading die movable laterally into and out of endwise alignment with said blank, means for forcing said heading die against the butt end of the nail blank while it is held by said pinch dies to thus form a head on the blank, means for releasing the thus headed nail from said dies, and means for guiding the released nail to a storage receptacle.

17. In a cut nail machine of the class described, a shear holder, bearing means supporting the holder with freedom for oscillatory movement, an arm secured to the holder, means for imparting an oscillating movement thereto, a member slidably mounted in the holder and having a shear blade secured thereto, springs interposed between the holder and said supporting means, a walking beam mounted on a fixed pivot, a push rod pivotally secured to the walking beam, said shear supporting member having a spherical socket, the extremity of the push rod having a sphere-like portion for engagement with said socket, and means for rocking said walking beam about said fixed pivot.

18. In a cut nail machine of the class described, a member mounted for limited oscillatory movement in a horizontal plane, a shear supporting element vertically slidable therein having a shear blade secured thereto, means for oscillating said member, a walking beam mounted for rocking movement about a fixed horizontal pivot, a push rod depending therefrom having a compensating swivel connection with said shear supporting element, and means for rocking said walking beam.

19. In a cut nail machine of the class described, a member mounted for limited oscillatory movement in a horizontal plane, a shear supporting element vertically slidable therein and having a shear blade detachably secured thereto, means for oscillating said member, a walking beam mounted for rocking movement about a horizontal pivot, a push rod depending therefrom having a compensating swivel connection with said shear supporting element, a crankshaft, a pitman actuated to be operatively connected with said walking beam, a pivotally mounted feed lever carrying a feed dog for advancing nail stock to a position to be sheared by said shear blade, a slotted lever carrying an adjustable block, a link pivotally connected with said block and said feed lever, the position of said block being effective to vary the amount of stock fed by the feed dog, and means connecting said slotted lever with said pitman.

20. In a cut nail machine of the class described, a member mounted for oscillatory movement, a ledger blade secured thereto, means for periodically oscillating said member at predetermined intervals, an element slidably mounted in said member and having a shear blade secured thereto, cushion elements interposed between said member and said element, a walking beam mounted for rocking movement with respect to a pivotal support, means pivotally connected thereto having a swivel connection with said element so as to compensate for the oscillatory movement of said member and the rocking member of said walking beam, and power actuated means for rocking said walking beam.

21. In a cut nail machine of the character described, a pair of coacting pinch dies, one of which is normally fixed and the other of which is movably mounted, means for moving the movably mounted die toward and from the fixed die, said dies having respective nail blank engaging faces, means for delivering nail blanks thereto in upright vertical positions, a heading die mounted below the pinch dies, a laterally movable support for the heading die adapted to move the same into and out of alignment with a nail blank gripped by the pinch dies, and means for imparting a gradual, powerful force to the heading die in a vertical upward direction whereby a head is formed on the nail blank gripped by the pinch dies.

22. In a cut nail machine of the character described, a pair of coacting pinch dies, one of which is normally fixed and the other of which is movably mounted, means for moving the movably mounted die toward and from the fixed die, said dies having respective nail blank engaging faces, means for delivering nail blanks thereto in predetermined desired positions, a heading die mounted below the pinch dies, a movable mounting for the heading die swingable into and out of alignment with nail blank held by the pinch dies, said mounting having a longitudinal cavity therein, a shank slidable in the cavity, said heading die being secured to said shank, yielding means forcing the shank and heading die to a predetermined position with respect to the underside of the pinch dies, adjusting means for varying the position of the heading die with relation to the pinch die, a heading die operating lever, and power means coacting therewith for forcing said shank and heading die toward said pinch dies.

23. A nail machine comprising, in combination, a pair of coacting pinch dies, means for delivering nail blanks thereto in an upright vertical position, a heading die mounted adjacent the pinch dies against which the butt end of each vertical nail blank is adapted to come to rest upon being released from said delivery means, and means for imparting a gradual powerful force to the heading die whereby a head is formed on the vertically disposed upright nail blank while in the grip of said pinch dies.

24. A nail machine comprising, in combination, a pair of coacting pinch dies, means for delivering nail blanks thereto, a heading die mounted adjacent the pinch dies against which the butt end of each nail blank is adapted to come to rest upon being released from said delivery means, and means for imparting a gradual powerful force to the heading die whereby a head is formed on the nail blank while in the grip of said pinch dies.

BRUCE N. BLETSO.
GEORGE H. PERKINS.